US012668275B2

(12) United States Patent
Yeom et al.

(10) Patent No.: US 12,668,275 B2
(45) Date of Patent: Jun. 30, 2026

(54) SYSTEM AND METHOD FOR CONTROLLING A VEHICLE ENTERING A ROUNDABOUT

(71) Applicants: HYUNDAI MOTOR COMPANY, Seoul (KR); KIA CORPORATION, Seoul (KR)

(72) Inventors: Myung Ki Yeom, Incheon (KR); In Su Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 150 days.

(21) Appl. No.: 18/608,545

(22) Filed: Mar. 18, 2024

(65) Prior Publication Data

US 2025/0206333 A1      Jun. 26, 2025

(30) Foreign Application Priority Data

Dec. 22, 2023    (KR) ........................ 10-2023-0189215

(51) Int. Cl.
*B60W 60/00*          (2020.01)
*B60W 30/18*          (2012.01)
*B60W 40/10*          (2012.01)

(52) U.S. Cl.
CPC .... *B60W 60/001* (2020.02); *B60W 30/18109* (2013.01); *B60W 40/10* (2013.01);
(Continued)

(58) Field of Classification Search
CPC ......... B60W 60/001; B60W 30/18109; B60W 40/10; B60W 2420/403; B60W 2510/182;
(Continued)

(56) References Cited

U.S. PATENT DOCUMENTS 11,801,864 B1 * 10/2023  Arora ..................... G06N 3/084
2001/0020217 A1 *  9/2001  Matsuno ................. B60T 7/22
                                                        340/436
(Continued)

FOREIGN PATENT DOCUMENTS

CA          2196019 A1 *  8/1997  ............. G01C 21/26
CN        101565041 B  * 12/2013  .......... B60W 30/025
(Continued)

OTHER PUBLICATIONS

CA_2196019_A1_I_translation (Year: 1997).*
(Continued)

*Primary Examiner* — Kyle T Johnson
(74) *Attorney, Agent, or Firm* — Lempia Summerfield Katz LLC

(57) ABSTRACT

A system for controlling a vehicle entering a roundabout includes a sensor unit configured to recognize a traffic island provided in the roundabout. The system also includes an autonomous driving controller configured to set defense zones based on the traffic island and a speed of the vehicle. The defense zones may indicate danger zones that one or both of i) cause collision between the vehicle and the traffic island or ii) deteriorate stability of the vehicle based on the traffic island and a speed of the vehicle. The system may additionally include a braking controller configured to perform braking of the vehicle entering the defense zones.

18 Claims, 5 Drawing Sheets

(52) U.S. Cl.

CPC . *B60W 2420/403* (2013.01); *B60W 2510/182* (2013.01); *B60W 2520/10* (2013.01); *B60W 2552/05* (2020.02)

(58) Field of Classification Search

CPC ......... B60W 2520/10; B60W 2552/05; B60W 30/18154; B60W 30/18159; B60W 60/0015; B60W 2554/20; B60W 2710/182; B60W 10/18; B60W 40/06; B60W 2556/45; B60W 2720/10

See application file for complete search history.

(56) References Cited

U.S. PATENT DOCUMENTS

| | | | | |
|---|---|---|---|---|
| 2009/0185718 A1* | 7/2009 | Moritz | ................... | B60Q 1/085 |
| | | | | 382/104 |
| 2015/0314789 A1* | 11/2015 | Roos | .................... | G07C 5/0825 |
| | | | | 701/123 |
| 2016/0161270 A1* | 6/2016 | Okumura | .............. | G08G 1/165 |
| | | | | 701/23 |
| 2016/0200317 A1* | 7/2016 | Danzl | ................... | B60W 10/04 |
| | | | | 701/25 |
| 2016/0318509 A1* | 11/2016 | Rycroft | ................ | B60T 8/1755 |
| 2018/0111611 A1* | 4/2018 | MacNeille | ...... | B60W 30/18163 |
| 2019/0377354 A1* | 12/2019 | Shalev-Shwartz | ... | G05D 1/0257 |
| 2020/0074863 A1* | 3/2020 | Jung | ....................... | G08G 1/164 |
| 2020/0110418 A1* | 4/2020 | Lee | ........................ | G08G 1/166 |
| 2020/0286386 A1* | 9/2020 | Zhou | .............. | G08G 1/096775 |
| 2021/0237735 A1* | 8/2021 | Ha | ........................ | B60W 50/14 |
| 2021/0291651 A1* | 9/2021 | Ediger | ................ | B60W 30/143 |
| 2022/0234581 A1* | 7/2022 | Kim | ..................... | B60W 10/18 |
| 2023/0140569 A1* | 5/2023 | Foster | ................. | B60W 30/146 |
| | | | | 701/400 |
| 2024/0140420 A1* | 5/2024 | Yoshida | .............. | B60W 30/143 |
| 2024/0416899 A1* | 12/2024 | Barrera | .................. | G06V 10/82 |
| 2025/0010877 A1* | 1/2025 | Fan | ........................ | B60K 35/28 |
| 2025/0206333 A1* | 6/2025 | Yeom | .............. | B60W 30/18159 |
| 2025/0249896 A1* | 8/2025 | Ikari | ................. | B60W 30/0956 |

FOREIGN PATENT DOCUMENTS

| | | | | | |
|---|---|---|---|---|---|
| CN | 113677585 | A | * 11/2021 | ........... | B60W 50/00 |
| DE | 10125966 | A1 | * 5/2002 | ........... | B62D 13/00 |
| DE | 102015205133 | A1 | * 9/2016 | ........... | B60W 50/14 |
| KR | 20170040604 | A | * 4/2017 | ........... | B60W 30/08 |
| KR | 20230026564 | A | * 2/2023 | ........ | B60W 60/0015 |
| KR | 20250098185 | A | * 7/2025 | ...... | B60W 30/18159 |
| WO | WO-2019095013 | A1 | * 5/2019 | ........... | G01S 15/931 |

OTHER PUBLICATIONS

CN_101565041_B_I_translation (Year: 2013).*
CN_113677585_A_I_translation (Year: 2021).*
DE_10125966_A1_I_translation (Year: 2002).*
DE_102015205133_A1_I_translation (Year: 2016).*
KR_20170040604_A_I_translation (Year: 2017).*
KR_20230026564_A_I_translation (Year: 2023).*
Leonardi_Roundabout_Trajectory_planning_2023 (Year: 2023).*
Wang_Cooperative_roundabout_control_strategy_for_connected_ and_autonomous_vehicles_2022 (Year: 2022).*
KR_20250098185_A_I_translation (Year: 2025).*
Processing_dense_stereo_data_using_elevation_maps_road_surface_ traffic_isle (Year: 2010).*

* cited by examiner

FIG. 6

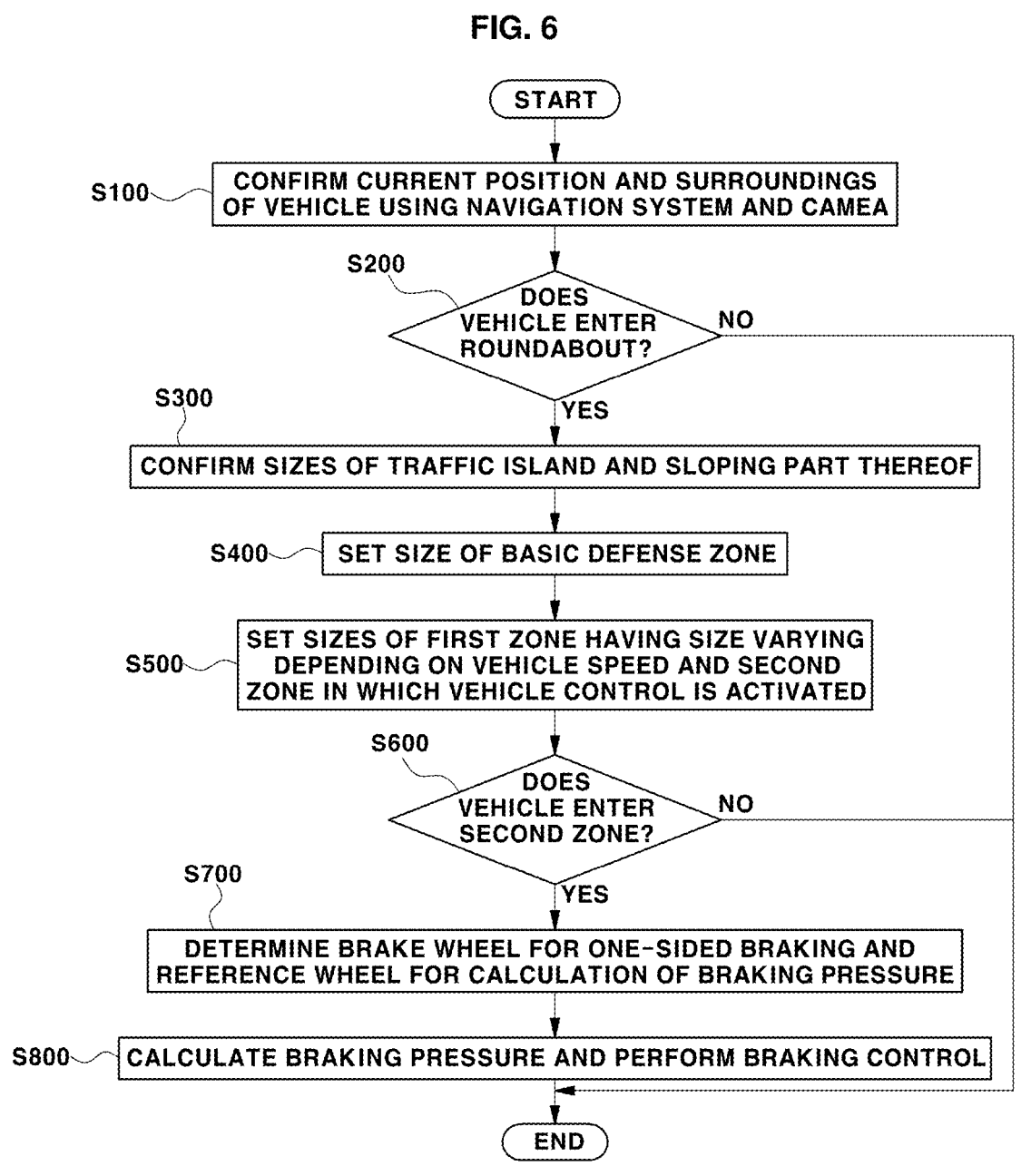

START

S100 — CONFIRM CURRENT POSITION AND SURROUNDINGS OF VEHICLE USING NAVIGATION SYSTEM AND CAMEA

S200 — DOES VEHICLE ENTER ROUNDABOUT? — NO

YES

S300 — CONFIRM SIZES OF TRAFFIC ISLAND AND SLOPING PART THEREOF

S400 — SET SIZE OF BASIC DEFENSE ZONE

S500 — SET SIZES OF FIRST ZONE HAVING SIZE VARYING DEPENDING ON VEHICLE SPEED AND SECOND ZONE IN WHICH VEHICLE CONTROL IS ACTIVATED

S600 — DOES VEHICLE ENTER SECOND ZONE? — NO

YES

S700 — DETERMINE BRAKE WHEEL FOR ONE-SIDED BRAKING AND REFERENCE WHEEL FOR CALCULATION OF BRAKING PRESSURE

S800 — CALCULATE BRAKING PRESSURE AND PERFORM BRAKING CONTROL

END

SYSTEM AND METHOD FOR CONTROLLING A VEHICLE ENTERING A ROUNDABOUT

CROSS-REFERENCE TO RELATED APPLICATION

This application claims the benefit of and priority to Korean Patent Application No. 10-2023-0189215, filed on Dec. 22, 2023, the entire contents of which are incorporated herein by reference.

TECHNICAL FIELD

The present disclosure relates to a system and method for controlling a vehicle entering a roundabout.

BACKGROUND

For convenience of users driving vehicles, various sensors and electronic devices are being installed in the vehicles. Particularly, development of technologies for autonomous driving systems of vehicles that recognize surrounding environments without driver intervention and autonomously drive to a given destination based on the recognized surrounding environments is actively taking place.

An autonomous vehicle refers to a vehicle equipped with an autonomous driving system function that recognizes surrounding environments without driver intervention and autonomously drive to a given destination based on the recognized surrounding environments.

When driving in a roundabout, there are cases in which drivers drive vehicles on a sloping part of a traffic island to prevent load on the vehicles from shaking. However, when driving excessively close to the traffic island, there is a possibility that the vehicle may collide with the traffic island or a structure near the traffic island. In particular, when a vehicle is traveling at a high speed through the roundabout, there is a problem in that excessive roll of the vehicle traveling on the sloping part of the traffic island occurs, and thus driving stability is reduced.

When autonomous driving of a vehicle is performed to avoid a sloping part of a traffic island, particularly in the case of a large vehicle, there is a problem of roll occurring due to rotation of the large vehicle. Also, when autonomous driving of a vehicle is performed so as to excessively drive on a sloping part of a traffic island, there is also a problem of excessive roll of the vehicle.

The above information disclosed in this Background section is provided only to enhance understanding of the background of the disclosure. Therefore, the Background section may contain information that does not form the prior art that is already known to a person of ordinary skill in the art.

SUMMARY

The present disclosure has been made in an effort to solve the above-described problems associated with the prior art. An object of the present disclosure is to provide a system and method for controlling a vehicle entering a roundabout in which braking control of the vehicle entering defense zones set based on a traffic island is performed in order to prevent collision with a structure on the traffic island and to secure driving stability of the vehicle.

According to embodiments of the present disclosure, autonomous driving logic is provided that allows a driver to appropriately use sloping parts of traffic islands.

According to embodiments of the present disclosure, braking of a vehicle is performed using relations between the vehicle entering a roundabout and a traffic island in the roundabout.

In an aspect, a system is provided for controlling a vehicle entering a roundabout. The system includes a sensor unit configured to recognize a traffic island provided in the roundabout. The system also includes an autonomous driving controller configured to set defense zones based on the traffic island and a speed of the vehicle. The defense zones indicate danger zones that one or both of i) cause collision between the vehicle and the traffic island or ii) deteriorate stability of the vehicle. The system additionally includes a braking controller configured to perform braking of the vehicle entering the defense zones.

In an embodiment, the defense zones may include i) a basic defense zone determined based on a size of the traffic island, ii) a first zone configured to extend from the basic defense zone depending on the speed of the vehicle, and iii) a second zone configured such that control of the vehicle is activated therein. The autonomous driving controller may be configured to perform control of the vehicle when the vehicle enters the second zone.

In an embodiment, a range of the first zone may be increased based on a value obtained by subtracting a first basic speed of the vehicle from a current speed of the vehicle. The current speed may indicate a speed of the vehicle at a point in time when the vehicle enters the roundabout. A radius of the first zone may be smaller than or equal to a radius of the traffic island.

In an embodiment, a size of the first zone in a radial direction based on a center of the traffic island may be calculated by multiplying the value obtained by subtracting the first basic speed of the vehicle from the current speed of the vehicle by a first set value.

In an embodiment, a range of the second zone may be increased based on a value obtained by subtracting a second basic speed of the vehicle from the current speed of the vehicle. The second basic speed may be lower than the first basic speed.

In an embodiment, a size of the second zone in the radial direction based on the center of the traffic island may be calculated by multiplying the value obtained by subtracting the second basic speed of the vehicle from the current speed of the vehicle by a second set value. The second set value may be greater than the first set value.

In an embodiment, the autonomous driving controller may be further configured to determine a size of the basic defense zone based on a value obtained by subtracting a size of a sloping part of the traffic island from a radius of the traffic island.

In an embodiment, the sensor unit may include at least one of a camera mounted in the vehicle or a navigation system mounted in the vehicle. The autonomous driving controller may be further configured to determine whether or not the vehicle enters the roundabout, a radius of the traffic island, and a size of a sloping part of the traffic island based on information received from the at least one of the camera or the navigation system.

In an embodiment, the autonomous driving controller may be further configured to, when the vehicle enters the defense zones, select a wheel located at a position farthest from the defense zones as a wheel for one-sided braking in consideration of a direction in which the vehicle turns around the traffic island.

In an embodiment, the autonomous driving controller may be further configured to calculate a braking pressure based on a wheel located at a position closest to a center of the defense zones.

In an embodiment, the defense zones may include i) a basic defense zone determined based on a size of the traffic island, ii) a first zone configured to extend from the basic defense zone depending on the speed of the vehicle, and iii) a second zone configured such that control of the vehicle is activated therein. The braking pressure may be proportional to a distance by which the wheel located closest to the center of the defense zones enters from a boundary of the second zone toward the center of the defense zones.

In an embodiment, the autonomous driving controller may be configured to calculate the braking pressure based on a value obtained by dividing the distance by which the wheel located closest to the center of the defense zones enters from the boundary of the second zone toward the center of the defense zones by a distance between the boundary of the second zone and a boundary of the first zone.

In another aspect, a method is provided for controlling a vehicle entering a roundabout. The method includes acquiring, by a sensor unit, information about a traffic island provided in the roundabout. The method also includes setting, by an autonomous driving controller, defense zones based on the traffic island and a speed of the vehicle. The defense zones may indicate danger zones that one or both of i) cause collision between the vehicle and the traffic island or ii) deteriorate stability of the vehicle. The method additionally includes determining, by the autonomous driving controller, a brake wheel for performing braking from among wheels of the vehicle. The method further includes calculating, by the autonomous driving controller, a braking pressure to be applied to the brake wheel when the vehicle enters the defense zones.

In an embodiment, setting the defense zones may include setting a basic defense zone based on a size of the traffic island and the speed of the vehicle acquired from the sensor unit. Setting the defense zones may also include setting a first zone defined as having a size greater than or equal to a size of the basic defense zone based on a value obtained by subtracting a first basic speed of the vehicle from a current speed of the vehicle. Setting the defense zones may further include setting a second zone defined as having a size greater than or equal to the size of the first zone based on a value obtained by subtracting a second basic speed of the vehicle from the current speed of the vehicle. The first basic speed may be higher than the second basic speed.

In an embodiment, determining the brake wheel and calculating the braking pressure may be activated when the vehicle enters the second zone.

In an embodiment, the method may further include, when the vehicle enters the second zone, selecting, by the autonomous driving controller, a wheel located at a position farthest from the defense zones as a wheel for one-sided braking in consideration of a direction in which the vehicle turns around the traffic island.

In an embodiment, calculating the braking pressure may include calculating the braking pressure based on a reference wheel located at a position closest to a center of the defense zones. The braking pressure may be proportional to a distance by which the reference wheel enters from a boundary of the second zone toward the center of the defense zones.

In an embodiment, the method may further include performing, by a braking controller, one-sided braking based on information about the brake wheel and information about the braking pressure to be applied to the brake wheel.

Other aspects and embodiments of the present disclosure are discussed below.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein:

FIG. 6 is a flowchart of a method of controlling a vehicle entering a roundabout, according to an embodiment of the present disclosure.

Figure 1:
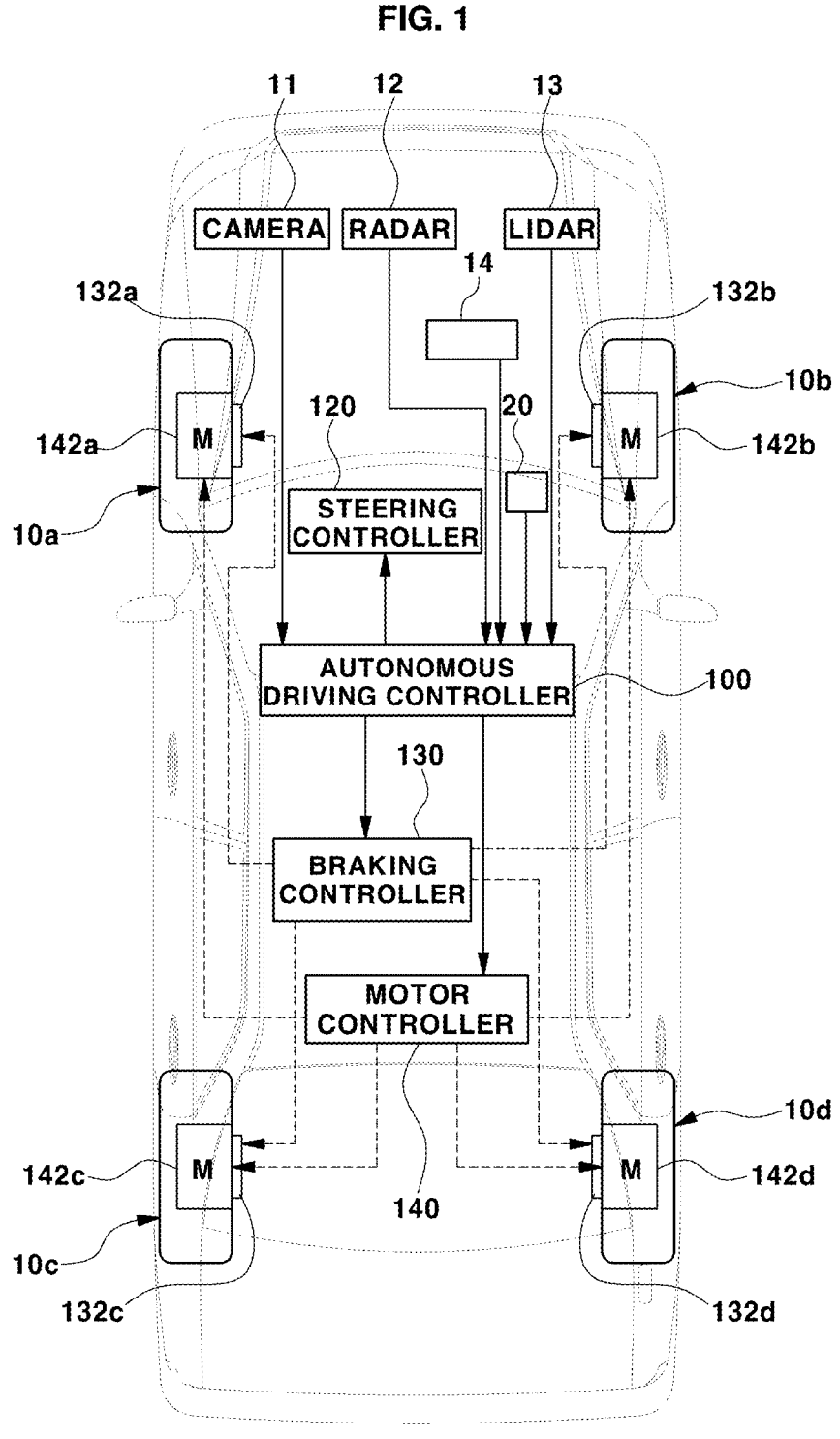
FIG. 1 is a view illustrating components that implement a system for controlling a vehicle entering a roundabout, according to an embodiment of the present disclosure.

It should be understood that the appended drawings are not necessarily to scale, presenting a somewhat simplified representation of various features illustrative of the basic principles of the present disclosure. The specific design features of embodiments of the present disclosure as disclosed herein, including, for example, specific dimensions, orientations, locations, and shapes, will be determined in part by the particular intended application and use environment.

In the figures, reference numbers refer to the same or equivalent parts throughout the several figures of the drawing.

DETAILED DESCRIPTION

Advantages and features of the present disclosure and methods for achieving the same should become more apparent from the descriptions of the embodiments hereinbelow with reference to the accompanying drawings. However, the present disclosure is not limited to the embodiments disclosed herein and may be implemented in various different forms. The embodiments disclosed herein are provided to make the description of the present disclosure thorough and to fully convey the scope of the present disclosure to those having ordinary skill in the art. The scope of the present disclosure is defined only by the appended claims. In the following description of the embodiments, the same or similar elements are denoted by the same reference numerals even when the elements are depicted in different drawings.

In the following description of the embodiments, it should be understood that the suffixes "part", "unit", "module", etc. indicate units for processing at least one function or operation, and may be implemented as hardware (e.g., a processor), software, or a combination of hardware (e.g., a processor) and software.

In addition, in the following description of the embodiments, terms such as "first" and "second" are used only to distinguish various elements from each other because the names of the elements are the same. Such terms do not imply a sequence or order unless clearly indicated by the context.

When a component, device, element, or the like of the present disclosure is described as having a purpose or performing an operation, function, or the like, the component, device, or element should be considered herein as being "configured to" meet that purpose or to perform that operation or function.

The following detailed description is illustrative of the present disclosure. Further, the detailed description is intended to illustrate specific embodiments of the present disclosure. The present disclosure may be used in various other combinations, modifications, and environments. In other words, changes or modifications can be made within the scope of the disclosure described in the specification, equivalents, and/or within the scope of technology or knowledge in the art to which the present disclosure pertains. The following embodiments are intended to illustrate the best mode for implementing the technical idea of the present disclosure, and various changes required for specific application fields and uses of the present disclosure are also possible. Accordingly, the following detailed description of the present disclosure is not intended to limit the disclosure to the disclosed embodiments. Additionally, the appended claims should be construed to include other embodiments.

FIG. 1 is a view illustrating components that implement a system for controlling a vehicle entering a roundabout, according to an embodiment of the present disclosure.

Referring to FIG. 1, a vehicle may be equipped with a plurality of controllers 100, 120, 130 and 140 to control autonomous driving. The controllers 100, 120, 130 and 140 may include an autonomous driving controller 100 that determines and calculates data required to control autonomous driving, calculates a vehicle's driving path in real time through calculations from surrounding environment sensor information without driver's operation, and provides commands. The controllers may also include a steering controller 120, a braking controller 130 and a motor controller 140 that directly control the vehicle based on the data calculated or determined by the autonomous driving controller 100. Each of the autonomous driving controller 100, the steering controller 120, the braking controller 130, and the motor controller 140 may be an electronic control unit (ECU) or processor. The autonomous driving controller 100, the steering controller 120, the braking controller 130 and the motor controller 140 may perform cooperative control with each other.

The autonomous driving controller 100 may receive various data necessary for autonomous driving from an autonomous driving sensor unit. The sensor unit may include a camera 11, a radio detection and ranging (radar) sensor 12, a light detection and ranging (LiDAR) sensor 13, and a navigation system 14. The autonomous driving controller 100 may be configured to perform overall autonomous driving control including driving direction control, acceleration, deceleration, and braking control of the vehicle based on the data received from the sensor unit.

The camera 11, the radar sensor 12, and the LiDAR sensor 13 may detect objects and other vehicles around the vehicle. In one embodiment of the present disclosure, the camera 11, the radar sensor 12, and the LiDAR sensor 13 may detect the position of a traffic island located in a roundabout, a distance between the traffic island and the vehicle, and the position of the vehicle within defense zones set based on the traffic island.

The navigation system 14 may acquire information about the position of the vehicle and information about a traffic island located around the vehicle. The information about the traffic island obtained by the navigation system 14 may include the radius of the traffic island and the size of a sloping part of the traffic island. In general, a traffic island may be located at the center of a roundabout, and may refer to an island-type structure created in a special shape within the roundabout to prevent vehicles from entering.

The information about the traffic island acquired by the camera 11, the radar sensor 12, the LiDAR sensor 13, and the navigation system 14 may be transmitted to the autonomous driving controller 100. The autonomous driving controller 100 may detect the radius of the traffic island, the size of the sloping part thereof, and the like by combining the information received by the navigation system 14 and the information acquired by the camera 11. The autonomous driving controller 100 may calculate information necessary for braking the vehicle depending on the relations between the vehicle and the traffic island. In an embodiment, the autonomous driving controller 100 may perform braking of the vehicle to ensure stability of the vehicle when the vehicle invades defense zones set based on the traffic island. For example, the autonomous driving controller 100 may determine a wheel to perform one-sided braking of the vehicle, and may calculate braking pressure to be applied to the corresponding wheel so as to perform one-sided braking of the vehicle.

A vehicle speed sensor 20 may be disposed in the vehicle. The vehicle speed sensor 20 may measure the current speed of the vehicle, and may transmit the measured current speed of the vehicle to the autonomous driving controller 100.

The autonomous driving controller 100 may transmit signals indicating a steering angle and a steering direction to the steering controller 120 so as to control rotation of the host vehicle. The autonomous driving controller 100 may also transmit information about a wheel requiring braking and a braking torque signal to the braking controller 130. The autonomous driving controller 100 may additionally transmit information about a wheel requiring driving and a driving torque signal to the motor controller 140.

The steering controller 120 may be configured to perform steering control depending on a steering intention based on the autonomous driving logic of the autonomous driving controller 100 or a steering intention due to driver's steering wheel operation. The steering controller 120 may perform steering control for collision avoidance depending on a signal to rotate the host vehicle in preparation for collision with other vehicles.

The braking controller 130 may selectively apply braking torque to braking devices 132a, 132b, 132c and 132d mounted on respective wheels 10a, 10b, 10c and 10d depending on the wheel requiring braking and the braking torque signal. The braking controller 130 may be an integrated electric brake (IEB) control unit including an electronic stability control (ESC) system to control vehicle stability. The braking controller 130 may refer to a brake-by-wire system that brakes each of the wheels 10a, 10b, 10c and 10d. The braking controller 130 may apply braking force to each of the wheels 10a, 10b, 10c and 10d depending on required braking force based on the autonomous driving logic of the autonomous driving controller 100 or a driver's braking intention (e.g., the stroke of a brake pedal). Braking force may be applied to the wheels 10a, 10b, 10c and 10d even if the brake pedal operated by the driver is not mechanically connected to the braking devices 132*a*, 132*b*, 132*c* and 132*d* connected to the wheels 10*a*, 10*b*, 10*c* and 10*d*.

The braking controller 130 may control the wheel requiring braking (sometimes referred to herein as a brake wheel) based on information about the brake wheel determined by the autonomous driving controller 100 and the braking pressure to be applied to the brake wheel calculated by the autonomous driving controller 100. The braking controller 130 may perform one-sided braking in which braking force is applied only to the brake wheel (i.e., the wheel requiring braking) selected from among the wheels 10*a*, 10*b*, 10*d*, and 10*d* by the autonomous driving controller 100.

The motor controller 140 may basically apply driving torque for driving to motors 142*a*, 142*b*, 142*c*, and 142*d* mounted on the respective wheels 10*a*, 10*b*, 10*c* and 10*d* of the vehicle. The motor controller 140 may control forward or reverse driving of wheels that perform driving based on the information received from the autonomous driving controller 100. Therefore, forward or reverse driving of the wheels 10*a*, 10*b*, 10*c* and 10*d* may be performed separately by the respective motors 142*a*, 142*b*, 142*c* and 142*d*. Also, driving torques or braking torques applied to the respective motors 142*a*, 142*b*, 142*c* and 142*d* may be different.

Figure 2:
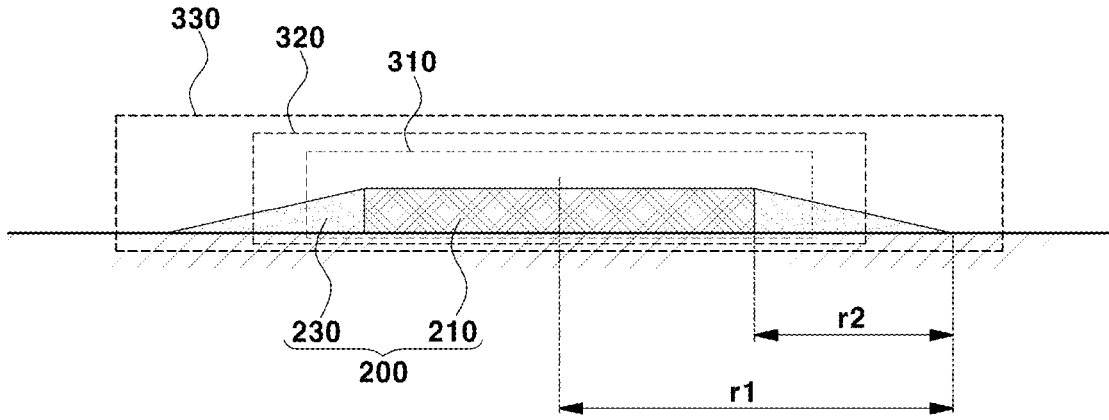
FIGS. 2 and 3 are views illustrating defense zones, according to an embodiment of the present disclosure.
Figure 3:
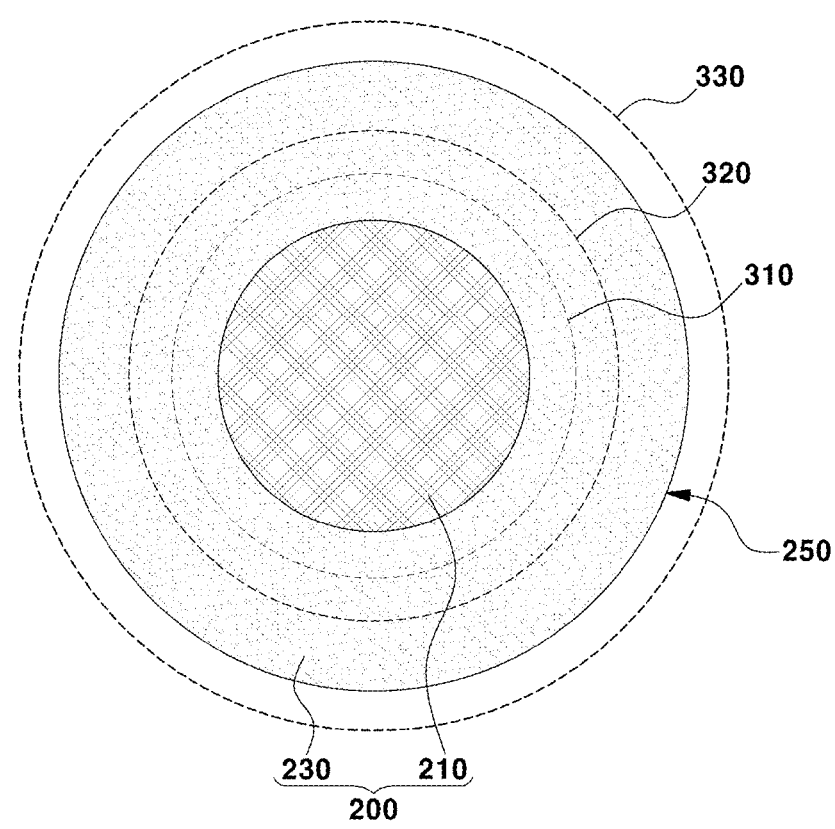

FIGS. 2 and 3 are views illustrating defense zones, according to an embodiment of the present disclosure.

Referring to FIGS. 1-3, the autonomous driving controller 100 may receive information about the radius r1 of a traffic island 200, the size r2 of a sloping part 230 of the traffic island 200, and the height of the traffic island 200 from the sensor unit. The autonomous driving controller 100 may set defense zones 310, 320, and 330 indicating danger zones that cause collision between the vehicle and the traffic island 200 or deteriorate stability of the vehicle based on the size of the traffic island 200 and the speed of the vehicle. The traffic island 200 may include a central part 210 and the sloping part 230. The outermost part of the traffic island 200 may be defined as a traffic island boundary 250. The speed of the vehicle used to set the defense zones 310, 320, and 330 may refer to a speed of the vehicle at a point in time when the vehicle enters the roundabout. The fact that the vehicle enters the roundabout may be determined by detecting the current position of the vehicle through the navigation system 14 mounted in the vehicle. Additionally, or alternatively, the fact that the vehicle enters the roundabout may be determined from the information acquired by the camera 11. Additionally, or alternatively, the fact that the vehicle enters the roundabout may be determined by combining the information acquired by the camera 11 and the information acquired by the navigation system 14.

The defense zones 310, 320, and 330 may include a basic defense zone 310 determined based on the size of the traffic island 200, a first zone 320 that is an area extending from the basic defense zone 310 depending on the speed of the vehicle, and a second zone 330 that is an area configured such that control of the vehicle is activated therein.

The size of the basic defense zone 310 may be determined based on a value obtained by subtracting the size r2 of the sloping part 230 of the traffic island 200 from the radius r1 of the traffic island 200. The size of the basic defense zone 310 may indicate a length extending in the radial direction from the center of the traffic island 200. The radius r1 of the traffic island 200 may indicate a radius from the center of the traffic island 200 to the outermost part 250 of the traffic island 200. For example, the traffic island 200 may be generally formed in a circular shape. The size r2 of the sloping part 230 may indicate a length extending in the radial direction from the center of the traffic island 200. In a process of setting the size of the basic defense zone 310, a safety distance value may be added to the value obtained by subtracting the size r2 of the sloping part 230 of the traffic island 200 from the radius r1 of the traffic island 200. Accordingly, the size of the basic defense zone 310 may be a value obtained by adding the safety distance value to the value obtained by subtracting the size r2 of the sloping part 230 of the traffic island 200 from the radius r1 of the traffic island 200. The safety distance value may be a tuning value set differently depending on a type of vehicle.

The first zone 320 may be an area extending from the basic defense zone 310 depending on the speed of the vehicle. Therefore, the size of the first zone 320 may be greater than or equal to the size of the basic defense zone 310. The size of the first zone 320 may indicate a length extending in the radial direction from the center of the traffic island 200. Further, the size of the first zone 320 may not be greater than the size of the traffic island 200. Therefore, the radius of the first zone 320 may be less than or equal to the radius r1 of the traffic island 200.

When the vehicle enters the roundabout at a high speed, driving stability of the vehicle may be decreased. When the vehicle turns within the roundabout while passing over the sloping part 230 of the traffic island 200 located at the center of the roundabout, driving of the vehicle may become unstable due to occurrence of roll of the vehicle, and driving instability of the vehicle may increase as the speed of the vehicle increases. In order to maximally prevent occurrence of roll of the vehicle, the vehicle should drive while passing over a portion of the sloping part 230 of the traffic island 200 that is not great in height. Further, the vehicle should drive while passing over a portion of the sloping part 230 having a lower height as the speed of the vehicle increases. Therefore, the size of the first zone 230 may be set to be larger as the speed of the vehicle increases. The size of the first zone 320 may be determined based on a value obtained by subtracting a first basic speed of the vehicle from the current speed of the vehicle. Specifically, the size of the first zone 320 may be a value obtained by adding the size of the basic defense zone 310 to a first increment determined based on the value obtained by subtracting the first basic speed of the vehicle from the current speed of the vehicle. The first basic speed may be predetermined by a designer, and may vary depending on the type of vehicle. The first increment may be calculated by multiplying i) the value obtained by subtracting the first basic speed of the vehicle from the current speed of the vehicle by ii) a predetermined first set value. When the current speed of the vehicle is lower than the first basic speed, the first increment may be 0. Therefore, when the current speed of the vehicle is lower than or equal to the first basic speed, the sizes of the basic defense zone 310 and the first zone 320 may be the same.

The second zone 330 may indicate an area that serves as a reference to determine a point in time when braking control of the vehicle is activated so as to secure stability of the vehicle. When braking control of the vehicle is performed after the vehicle has entered the first zone 320, it may be difficult to secure stability of the vehicle. Therefore, the second zone 330 may be determined to set a reference to perform braking control in advance so as to secure stability of the vehicle. When the vehicle enters the second zone 330, the autonomous driving controller 100 may determine the brake wheel (i.e., the wheel requiring braking) and the braking pressure to be applied to the brake wheel to perform braking control so as to secure stability of the vehicle. The braking controller 130 may control the brake wheel based on the braking pressure calculated by the autonomous driving controller 100.

The size of the second zone 330 may be greater than the radius r1 of the traffic island 200, but less than the size of a lane next to the vehicle in the roundabout. Accordingly, the size of the second zone 330 may be less than the radius of the lane next to the vehicle in the roundabout based on the center of the traffic island 200. The size of the second zone 330 may indicate a length extending in the radial direction from the center of the traffic island 200. The size of the second zone 330 may be determined based on a value obtained by subtracting a second basic speed of the vehicle from the current speed of the vehicle. Specifically, the size of the second zone 330 may be a value obtained by adding the size of the first zone 320 to a second increment determined based on the value obtained by subtracting the second basic speed of the vehicle from the current speed of the vehicle. The second increment may be calculated by multiplying the value obtained by subtracting the second basic speed of the vehicle from the current speed of the vehicle by a predetermined second set value. For example, the second basic speed may be lower than the first basic speed, and the second set value may be greater than the first set value. Since the second zone 330 is an area to determine whether or not to activate braking control of the vehicle, the size of the second zone 330 may be set to be greater than the size of the first zone 320 in terms of securing stability of the vehicle. The second increment may be made greater than the first increment by setting the second set value to be greater than the first set value and setting the second basic speed to be lower than the first basic speed. When the current speed of the vehicle is lower than the second basic speed, the second increment may be 0. The current speed of the vehicle that is lower than the second basic speed means that the vehicle is driving at a very low speed, and thus, driving of the vehicle may not become unstable even if braking control of the vehicle is not performed. Therefore, when the current speed of the vehicle is lower than the second basic speed, control according to an embodiment of the present disclosure may not be performed. Since the current speed of the vehicle is higher than the second basic speed when braking control of the vehicle is performed, the size of the second zone 330 may be greater than the sizes of the basic defense zone 310 and the first zone 320.

The higher the speed at which the vehicle enters the roundabout, the more roll may occur in the vehicle when the vehicle passes over the sloping part 230 of the traffic island 200. According to an embodiment of the present disclosure, the defense zones 310, 320, and 330 are set in multiple stages based on the traffic island 200 in consideration of the speed of the vehicle. Braking control of the vehicle is performed when the vehicle enters the second zone 330, thereby being capable of preventing collision between the vehicle and the traffic island 200 and suppressing roll occurring in the vehicle as much as possible.

Figure 4:
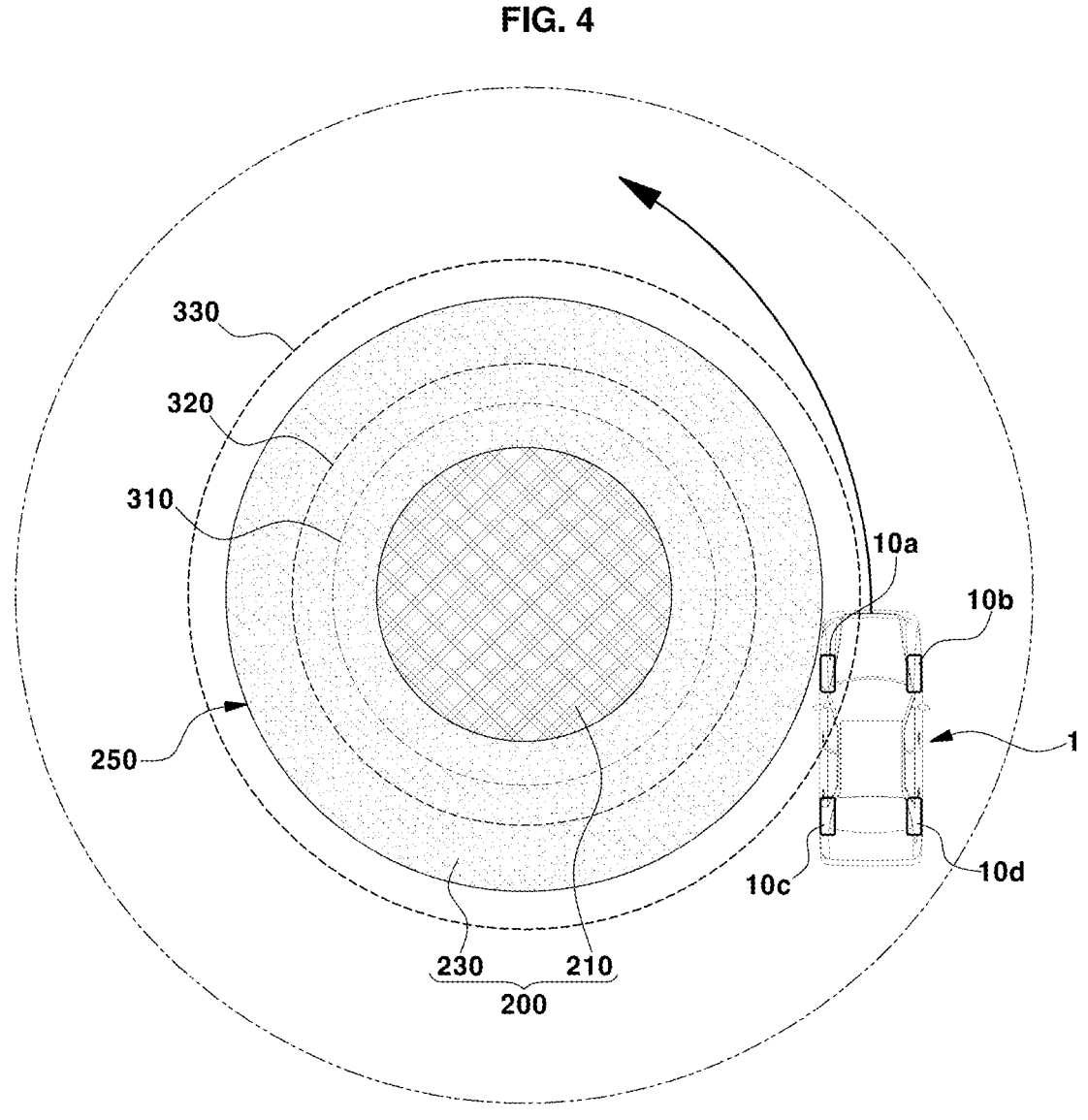
FIG. 4 is a view illustrating braking of the vehicle entering the roundabout performed depending on relations between the vehicle and the defense zones, according to an embodiment of the present disclosure.
Figure 5:
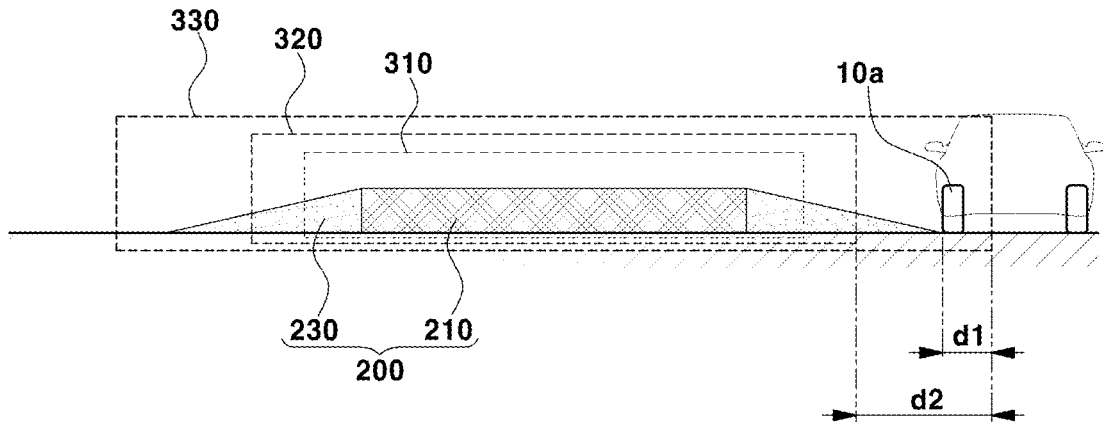
FIG. 5 is a view illustrating a method of calculating braking pressure to be applied to a brake wheel of the vehicle, according to an embodiment of the present disclosure.

FIG. 4 is a view illustrating braking of the vehicle entering the roundabout performed depending on relations between the vehicle and the defense zones, according to an embodiment of the present disclosure. FIG. 5 is a view illustrating a method of calculating braking pressure to be applied to the brake wheel of the vehicle, according to an embodiment of the present disclosure.

Referring to FIGS. 1, 4 and 5, when a vehicle 1 enters the roundabout, the autonomous driving controller 100 of the vehicle 1 may set the defense zones 310, 320, and 330 based on the speed of the vehicle 1 entering the roundabout and the size of the traffic island 200. The autonomous driving controller 100 may obtain the position of the traffic island 200 and the size of the sloping part 230, which were previously identified for each region, through the navigation system 14 or using predetermined data. The autonomous driving controller 100 may verify the size of the traffic island 200 and the size of the sloping part 230 in the process of entering the roundabout using the camera 11 mounted in the vehicle 1. Accordingly, reliability of information about the size of the traffic island 200 and the size of the sloping part 230, which were recognized in advance, may be increased using the camera 11. The autonomous driving controller 100 may correct or newly calculate the size of the traffic island 200 and the size of the sloping part 230 based on the information acquired using the navigation system 14 and the camera 11.

When the vehicle 1 enters the second zone 330, braking control of the vehicle 1 may be activated. The autonomous driving controller 100 may select a wheel 10*d* located at a position farthest from the defense zones 310, 320, and 330 or the center of the defense zones 310, 320, and 330 as a brake wheel 10*d* for one-sided braking in consideration of a direction in which the vehicle 1 turns around the traffic island 200. In this embodiment, the direction in which the vehicle 1 turns around the traffic island 200 may be the counterclockwise direction, and the rear right wheel 10*d* of the vehicle 1 may be selected as the brake wheel 10*d*. For example, the direction in which the vehicle 1 turns around the traffic island 200 may vary depending on the country or region. The autonomous driving controller 100 may select a wheel 10*a* located at a position closest to the defense zones 310, 320, and 330 or the center of the defense zones 310, 320, and 330 as a reference wheel 10*a*.

The autonomous driving controller 100 may calculate braking pressure based on the reference wheel 10*a*. In this embodiment, the front left wheel 10*a* of the vehicle 1 may be selected as the reference wheel 10*a*. The braking pressure may be proportional to a first distance d1 by which the reference wheel 10*a* located closest to the defense zones 310, 320, and 330 or the center of the defense zones 310, 320, and 330 enters from the boundary of the second zone 330 toward the center of the defense zones 310, 320, and 330. Specifically, the autonomous driving controller 100 may calculate the braking pressure based on a value obtained by dividing the first distance d1 by which the reference wheel 10*a* enters from the boundary of the second zone 330 toward the center of the defense zones 310, 320, and 330 by a second distance d2 between the boundary of the second zone 330 and the boundary of the first zone 320. More specifically, the autonomous driving controller 100 may calculate the braking pressure as a value obtained by multiplying the value obtained by dividing the first distance d1 by the second distance d2 by predetermined braking pressure. For example, the predetermined braking pressure may be the maximum allowable braking pressure when braking the vehicle 1. For example, the second distance d2 may be equal to the second increment determined based on the value obtained by subtracting the second basic speed of the vehicle from the current speed of the vehicle.

The autonomous driving controller 100 may determine the brake wheel 10*d*, and may calculate the braking pressure to be applied to the brake wheel 10*d*. The autonomous driving controller 100 may transmit the determined brake wheel 10*d* and the calculated braking pressure to the braking controller 130. The braking controller 130 may control the braking device 132*d* that may apply braking torque to the brake wheel 10*d* so as to perform one-sided braking of the vehicle 1, i.e., braking of the brake wheel 10*d*. By braking the brake wheel 10*d*, the vehicle 1 may be prevented from entering the basic defense zone 310 and the first zone 320 without steering control of the vehicle 1. In other words, when the vehicle 1 enters the second zone 330, the autonomous driving controller 100 performs one-sided braking of the vehicle 1 to prevent the vehicle 1 from entering the first zone 320.

According to an embodiment of the present disclosure, the autonomous driving controller 100 may prevent the vehicle 1 from entering the first zone 320 defined as being within the second zone 330 by performing one-sided braking of the vehicle 1, when the vehicle 1 enters the second zone defined as the outermost zone out of the defense zones 310, 320, and 330.

According to embodiments of the present disclosure, since the degree of one-sided braking of the vehicle 1 varies depending on the degree of entrance of the vehicle 1 into the defense zones 310, 320, and 330 set based on the size of the traffic island 200, a large vehicle may be permitted to drive using the sloping part 230 of the traffic island 200 while driving in the roundabout.

According to an embodiment of the present disclosure, the vehicle 1 may be prevented from entering the traffic island 200 only by one-sided braking without steering control of the vehicle 1, thereby being capable of minimizing a sense of difference felt by passengers in the vehicle 1 due to sudden control of the vehicle 1.

FIG. 6 is a flowchart representing a method of controlling a vehicle entering a roundabout, according to an embodiment of the present disclosure. For brevity of explanation, a description of redundant content has been omitted.

Referring to FIG. 6, in an operation S100, the vehicle may confirm the current position and surroundings of the vehicle using a camera and a navigation system mounted in the vehicle. Information about the surroundings of the vehicle may include whether or not the vehicle enters the roundabout, presence of a traffic island around the vehicle, and size of the traffic island.

In an operation S200, an autonomous driving controller of the vehicle may determine whether or not the vehicle enters the roundabout. Control logic according to an embodiment of the present disclosure may not be activated when the vehicle does not enter the roundabout.

In an operation S300, when the vehicle enters the roundabout, the autonomous driving controller may confirm or calculate the sizes of the traffic island and a sloping part of the traffic island based on the information acquired through the camera and the navigation system. The autonomous driving controller may monitor the current speed of the vehicle entering the roundabout using a vehicle speed sensor mounted in the vehicle.

In an operation S400, the autonomous driving controller may set the size of a basic defense zone based on the size of the traffic island, the size of the sloping part of the traffic island, and a predetermined safety distance value.

In an operation S500, the autonomous driving controller may set the sizes of a first zone and a second zone based on the current speed of the vehicle, predetermined basic speeds, and the set size of the basic defense zone. The first zone may indicate an area having a size varying depending on the vehicle speed, and the second zone may indicate an area having a size varying depending on the vehicle speed and configured such that control of the vehicle is activated. Specifically, the autonomous driving controller may set the size of the first zone based on the current speed of the vehicle, a predetermined first basic speed, the set size of the basic defense zone, and a first set value. The autonomous driving controller may set the size of the second zone based on the current speed of the vehicle, a predetermined second basic speed, the set size of the basic defense zone, and a second set value. The first basic speed may be higher than the second basic speed, and the first set value may be smaller than the second set value.

In an operation S600, the autonomous driving controller may monitor whether or not the vehicle enters the second zone. When the vehicle drives in the roundabout without entering the second zone, braking control of the vehicle may not be activated.

In an operation S700, when the vehicle enters the second zone, the autonomous driving controller may determine a brake wheel for performing one-sided braking of the vehicle and a reference wheel configured to calculate braking pressure to be applied to the brake wheel. The brake wheel may be a wheel located farthest from the center of the defense zones, and the reference wheel may be a wheel located closest to the center of the defense zones.

In an operation S800, the autonomous driving controller may calculate the braking pressure to be applied to the brake wheel using a distance by which the reference wheel enters from the boundary of the second zone toward the center of the defense zones, a distance between the first zone and the second zone, and a predetermined braking pressure. Information about the calculated braking pressure and information about the brake wheel may be transmitted from the autonomous driving controller to a braking controller of the vehicle. The braking controller may control a braking device corresponding to the brake wheel so as to apply braking toque corresponding to the braking pressure to the brake wheel. By braking by the brake wheel, the vehicle may not enter the first zone. Since steering control of the vehicle is not performed separately, a sense of difference felt by passengers in the vehicle may be minimized.

As is apparent from the above description, according to embodiments of the present disclosure, defense zones are set in multiple stages based on a traffic island in consideration of the speed of a vehicle entering a roundabout. Braking control of the vehicle is performed when the vehicle enters a second zone, thereby being capable of preventing collision between the vehicle and the traffic island and suppressing roll occurring in the vehicle as much as possible.

According to embodiments of the present disclosure, an autonomous driving controller of a vehicle may prevent the vehicle from entering a first zone defined as being within the second zone by performing one-sided braking of the vehicle, when the vehicle enters the second zone defined as the outermost zone out of the defense zones.

According to embodiments of the present disclosure, a vehicle may be prevented from entering a traffic island only by one-sided braking without steering control of the vehicle, thereby being capable of minimizing a sense of difference felt by passengers in the vehicle due to sudden control of the vehicle.

The disclosure has been described in detail with reference to specific embodiments thereof. However, it should be appreciated by those having ordinary skill in the art that changes may be made in these embodiments without departing from the principles and spirit of the present disclosure, the scope of which is defined in the appended claims and their equivalents.

What is claimed is:
1. A system for controlling a vehicle entering a roundabout, the system comprising:

a sensor unit configured to recognize a traffic island provided in the roundabout, the sensor unit includes at least one of a camera mounted in the vehicle or a navigation system mounted in the vehicle;

an autonomous driving controller configured to:

set defense zones based on the traffic island and a speed of the vehicle, wherein the defense zones indicate danger zones that one or both of i) cause collision between the vehicle and the traffic island or ii) deteriorate stability of the vehicle, and determine a radius of the traffic island and a size of a sloping part of the traffic island based on information received from the at least one of the camera or the navigation system; and a braking controller configured to perform braking of the vehicle entering the defense zones.

2. The system of claim 1, wherein:

the defense zones include i) a basic defense zone determined based on a size of the traffic island, ii) a first zone configured to extend from the basic defense zone depending on the speed of the vehicle, and iii) a second zone configured such that control of the vehicle is activated therein; and the autonomous driving controller is configured to perform control of the vehicle when the vehicle enters the second zone.

3. The system of claim 2, wherein:

a range of the first zone is increased based on a value obtained by subtracting a first basic speed of the vehicle from a current speed of the vehicle, wherein the current speed indicates a speed of the vehicle at a point in time when the vehicle enters the roundabout; and a radius of the first zone is smaller than or equal to a radius of the traffic island.

4. The system of claim 3, wherein a size of the first zone in a radial direction based on a center of the traffic island is calculated by multiplying the value obtained by subtracting the first basic speed of the vehicle from the current speed of the vehicle by a first set value.

5. The system of claim 4, wherein a range of the second zone is increased based on a value obtained by subtracting a second basic speed of the vehicle from the current speed of the vehicle, wherein the second basic speed is lower than the first basic speed.

6. The system of claim 5, wherein a size of the second zone in the radial direction based on the center of the traffic island is calculated by multiplying the value obtained by subtracting the second basic speed of the vehicle from the current speed of the vehicle by a second set value, wherein the second set value is greater than the first set value.

7. The system of claim 2, wherein the autonomous driving controller is further configured to determine a size of the basic defense zone based on a value obtained by subtracting a size of a sloping part of the traffic island from a radius of the traffic island.

8. The system of claim 1, wherein:

the autonomous driving controller is further configured to determine whether or not the vehicle enters the roundabout based on information received from the at least one of the camera or the navigation system.

9. The system of claim 1, wherein the autonomous driving controller is further configured to, when the vehicle enters the defense zones, select a wheel located at a position farthest from the defense zones as a wheel for one-sided braking in consideration of a direction in which the vehicle turns around the traffic island.

10. The system of claim 1, wherein the autonomous driving controller is further configured to calculate a braking pressure based on a wheel located at a position closest to a center of the defense zones.

11. The system of claim 10, wherein:

the defense zones comprise a basic defense zone determined based on a size of the traffic island, a first zone configured to extend from the basic defense zone depending on the speed of the vehicle, and a second zone configured such that control of the vehicle is activated therein; and the braking pressure is proportional to a distance by which the wheel located closest to the center of the defense zones enters from a boundary of the second zone toward the center of the defense zones.

12. The system of claim 11, wherein the autonomous driving controller is configured to calculate the braking pressure based on a value obtained by dividing the distance by which the wheel located closest to the center of the defense zones enters from the boundary of the second zone toward the center of the defense zones by a distance between the boundary of the second zone and a boundary of the first zone.

13. A method of controlling a vehicle entering a roundabout, the method comprising:

acquiring, by a sensor unit, information about a traffic island provided in the roundabout, wherein the sensor unit includes at least one of a camera mounted in the vehicle or a navigation system mounted in the vehicle;

setting, by an autonomous driving controller, defense zones based on the traffic island and a speed of the vehicle, wherein the defense zones indicate danger zones that one or both of i) cause collision between the vehicle and the traffic island or ii) deteriorate stability of the vehicle;

determining, by the autonomous driving controller, a radius of the traffic island and a size of a sloping part of the traffic island based on information received from the at least one of the camera or the navigation system included in the sensor unit;

determining, by the autonomous driving controller, a brake wheel for performing braking from among wheels of the vehicle; and calculating, by the autonomous driving controller, a braking pressure to be applied to the brake wheel when the vehicle enters the defense zones.

14. The method of claim 13, wherein setting the defense zones includes:

setting a basic defense zone based on a size of the traffic island and the speed of the vehicle acquired from the sensor unit;

setting a first zone defined as having a size greater than or equal to a size of the basic defense zone based on a value obtained by subtracting a first basic speed of the vehicle from a current speed of the vehicle; and setting a second zone defined as having a size greater than or equal to the size of the first zone based on a value obtained by subtracting a second basic speed of the vehicle from the current speed of the vehicle, wherein the first basic speed is higher than the second basic speed.

15. The method of claim 14, wherein determining the brake wheel and calculating the braking pressure is activated when the vehicle enters the second zone.

16. The method of claim 15, further comprising, when the vehicle enters the second zone, selecting, by the autonomous driving controller, a wheel located at a position farthest from the defense zones as a wheel for one-sided braking in consideration of a direction in which the vehicle turns around the traffic island.

17. The method of claim 16, wherein calculating the braking pressure includes calculating the braking pressure based on a reference wheel located at a position closest to a center of the defense zones, and wherein the braking pressure is proportional to a distance by which the reference wheel enters from a boundary of the second zone toward the center of the defense zones.

18. The method of claim 13, further comprising:
performing, by a braking controller, one-sided braking based on information about the brake wheel and information about the braking pressure to be applied to the brake wheel.

\* \* \* \* \*